(No Model.)

F. J. HARRISON.
COLOR VALUE CURTAIN SHUTTER.

No. 599,670. Patented Feb. 22, 1898.

WITNESSES
Edward F. Rowland
E. Simpson

INVENTOR
Frederick J. Harrison
BY Phillips Abbott
ATTORNEY

UNITED STATES PATENT OFFICE.

FREDERICK J. HARRISON, OF ORANGE, NEW JERSEY, ASSIGNOR TO THE E. & H. T. ANTHONY & COMPANY, OF NEW YORK.

COLOR-VALUE CURTAIN-SHUTTER.

SPECIFICATION forming part of Letters Patent No. 599,670, dated February 22, 1898.

Application filed August 5, 1896. Serial No. 601,705. (No model.)

*To all whom it may concern:*

Be it known that I, FREDERICK J. HARRISON, a subject of the Queen of Great Britain, and a resident of Orange, in the county of Essex and State of New Jersey, have invented certain new and useful Improved Apparatus for Color Photography, of which the following is a specification.

My invention relates to a new and useful device adapted to use in part in connection with ordinary photography, but more particularly intended to be employed for photographing in colors.

It is well known that in order to obtain true color values in color photography it is necessary to use between the sensitive plate and the light a screen dyed or stained in some suitable color. These screens have heretofore been made of glass and either placed in front of, behind, or between the lenses. With this arrangement it is impossible to employ the several screens in succession unless the lens is closed—in other words, the light excluded during the substitution of one color screen for the next one. For many reasons it is desirable to give a longer exposure through the red screen than through the green or the violet, and also it is highly useful to be able to make successive exposures through any number of screens, and yet not be compelled to close the lens during the change from one color to another. To attain this object is the purpose of this invention, which, generally stated, consists in mounting a thin flexible band or ribbon of translucent and preferably transparent material, such as celluloid, upon rollers, and dyeing, staining, or otherwise coloring the different portions of the ribbon with different colors, the two end sections thereof being, preferably, made opaque to act as ordinary dark slides, the portions between the ends being divided into sections of such relative lengths as may be desired to conform to the time of exposure necessary and colored accordingly. A suitable clockwork or other motor is supplied, which may be so adjusted, as now well understood in kindred apparatus, as to move the color-value screen rapidly for instantaneous work or more moderately for slower plates or sensitized surfaces.

Figure 1:
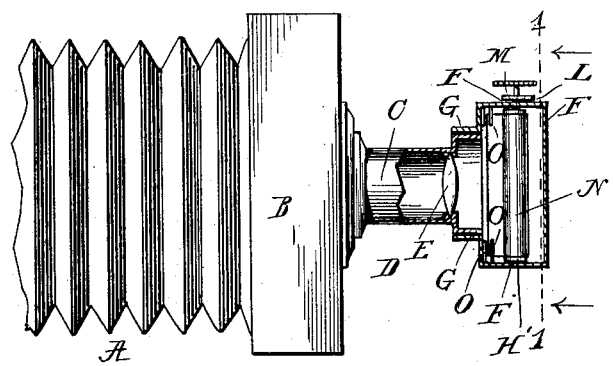
Figure 2:
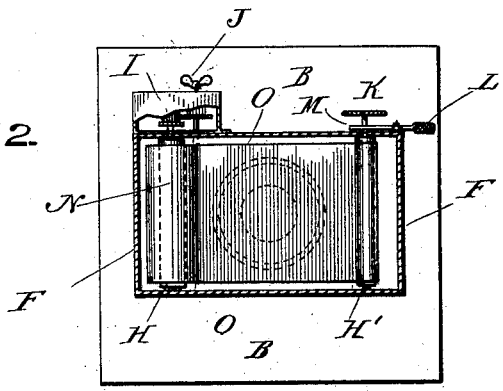
Figure 3:
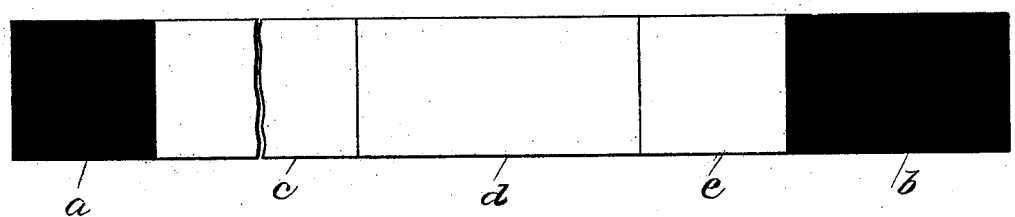

In the drawings hereof, Figure 1 illustrates an elevation, partly in section, showing the invention as applied to a part of a photographic camera. Fig. 2 illustrates a front elevation looking in the direction of the arrows in Fig. 1. Fig. 3 illustrates a view, partly broken away, of the colored ribbon of flexible material.

A is the bellows of an ordinary photographic camera. B is the front board thereof.

C is the lens-tube.

D is the lens, set in a lens-frame E.

F is a casing, which may be made of metal or any other suitable material, which is provided with a flange G, adapted to slip over the outer periphery of the lens-frame with sufficient snugness to hold the parts in position. Any other means of fastening the casing F may be employed. Inside of the casing are two rollers H H', which are journaled in the upper and lower walls of the casing.

I is a clockwork wound by a thumb-key J, which connects with the arbor of the roller H and rotates it at such speed as may be desired, so that the color-value ribbon will be wound up upon that roller with the requisite speed. K is a milled thumb-nut on the arbor of the other roller H', whereby the color-value ribbon may be wound back again upon that roller.

L is a latch or pawl which engages in any suitable manner with the arbor of the roller H', so as to hold it against rotation. I prefer to employ a small ratchet M, fastened on the said arbor, with which the pawl L engages to prevent rotation of the roller H' by the clockwork. Of course the pawl L is suitably actuated by a spring, as is well understood.

N is the color-value ribbon, made, as stated, of flexible, translucent, and preferably transparent material. I prefer to make it of celluloid, although other suitable material may be employed. In fact, any flexible substance or fabric which has the quality of transmitting light, preferably to such a degree as will constitute the same transparent, is suitable.

O O are longitudinally-extending guideways, which embrace the edges of the color-value ribbon with sufficient snugness to exclude light. As will be seen in Fig. 2, they extend somewhat beyond the exposure-opening.

The color-value ribbon N is shown best in Fig. 3. a and b are the two end sections of it, which are stained or colored with some material that will render them opaque, so that they shall act as a light-excluding slide or shield, so that when the ribbon is in its normal position prior to an exposure the section a will cover the exposure-orifice and exclude the light, and, similarly, at the termination of the exposure the section b will likewise act as a light-excluding shield or slide and prevent over-exposure. I prefer to make the section b somewhat larger than the section a, because it is desirable to have a little extra length of the opaque section at that end of the ribbon. The intermediate sections may be colored in such manner as preferred, and with such colors, shades of color, and density of color as desired, and that portion of the ribbon may be divided into sections of different lengths, depending upon the character of the work to be done and the special color or colors with which the sections are stained or dyed—as, for instance, it takes ten times as long for the red color to properly affect the plate as the violet—and so likewise other colors vary in the length of time to which the plate should be exposed to them. Therefore the section marked c may be colored red, the part d green, and the part e violet, the section c being ten times as long as e, and d being of intermediate length. It is entirely immaterial in which order these colors come, and frequently other colors are employed besides those named; also, sometimes one color only will be desired, and sometimes four, five, or more may be employed. All of these details are not of the essence of my invention, but may be varied to suit the requirements of each particular case.

As an example of coloring-matters which may beneficially be employed for the purpose of staining a celluloid ribbon, if celluloid be used, I mention the following: For giving it the desired red color or tinge I use chrysoidin. Green may be well produced with malachite green, and violet with the well-known Hoffman's violet. The first and last sections, which act as a dark slide, thus avoiding the necessity for any manipulation of a slide or capping device, may be made opaque by any of the ordinary black dyes or stains.

I wish it to be distinctly understood that I do not limit myself to celluloid as the material from which the color-value ribbon is to be made. Any suitable transparent or translucent material will suffice. Nor is it essential that the ribbon should be made all of one piece. Two or more pieces constituting different sections or two or more pieces in each section may be used, and this is true particularly of the opaque end sections. They may be beneficially made of ordinary black rubber cloth, such as used largely in photographic apparatus, and any other suitable motor other than clockwork may be employed. Indeed, I do not limit myself to the details of construction shown, because they may be varied without departing from the invention.

I claim—

1. A color-value ribbon or screen, composed of flexible, light-transmitting material, sectionally colored in different colors, and mounted upon rollers, one on each side of the exposure-aperture of a photographic apparatus, and means to rotate said rollers, for the purposes set forth.

2. A color-value ribbon or screen, composed of light-transmitting, flexible material, the ends whereof are opaque, and the intermediate portion colored, for the purposes set forth.

3. A color-value ribbon or screen, composed of light-transmitting, flexible material, the ends whereof are opaque and the intermediate portion is colored sectionally in different colors, for the purposes set forth.

4. A color-value ribbon or screen composed of light-transmitting material, divided transversely into sections, each of a different color, the sections being of different dimensions longitudinally of the ribbon, but all being of sufficient area to act one at a time upon the plate, for the purposes set forth.

5. A color-value ribbon or screen, composed of light-transmitting, flexible material, the ends whereof are opaque and the intermediate portion sectionally colored in different colors, the sections being of different areas, for the purposes set forth.

Signed at New York, in the county of New York and State of New York, this 27th day of July, A. D. 1896.

FREDERICK J. HARRISON.

Witnesses:
PHILLIPS ABBOTT,
E. SIMPSON.